Oct. 5, 1937.   J. A. FLINT   2,094,786
VIBRATORY DRYING CONVEYER
Filed June 18, 1935   7 Sheets-Sheet 1

INVENTOR:
James A. Flint,
BY
Chas. M. Nissen,
ATTY.

Oct. 5, 1937.  J. A. FLINT  2,094,786
VIBRATORY DRYING CONVEYER
Filed June 18, 1935  7 Sheets-Sheet 5

INVENTOR:
James A. Flint,
BY
Chas. M. Nissen,
ATTY.

Oct. 5, 1937.  J. A. FLINT  2,094,786
VIBRATORY DRYING CONVEYER
Filed June 18, 1935   7 Sheets-Sheet 6

INVENTOR:
James A. Flint,
By
Chas. M. Nissen.
ATTY.

Oct. 5, 1937.   J. A. FLINT   2,094,786
VIBRATORY DRYING CONVEYER
Filed June 18, 1935   7 Sheets-Sheet 7

INVENTOR:
James A. Flint,
By
Chas. M. Nissen,
ATTY.

Patented Oct. 5, 1937

2,094,786

UNITED STATES PATENT OFFICE 2,094,786

VIBRATORY DRYING CONVEYER

James A. Flint, Columbus, Ohio, assignor to The Traylor Vibrator Company, a corporation of Colorado Application June 18, 1935, Serial No. 27,231

5 Claims. (Cl. 34—38)

This invention relates to a vibratory drying conveyer, particularly of the type adapted to dry granular materials, examples of which are coal, salt, Glauber salt and chemical salts.

An object of the invention is to provide an improved drying system and method which will dry granular material in a minimum length of time.

A more specific object of the invention is to provide a vibratory drying conveyer for granular material which will be effective to expose the whole surface of each grain of the granular material to the drying action of hot gas, such as hot air, so that said granular material may be dried in a minimum length of time.

Other objects of the invention will appear hereinafter, the novel features and combinations being set forth in the appended claims.

Figs. 12 to 21, inclusive, show various forms of deck coverings which may be employed with the vibratory drying conveyer comprising my invention;

Figure 1:
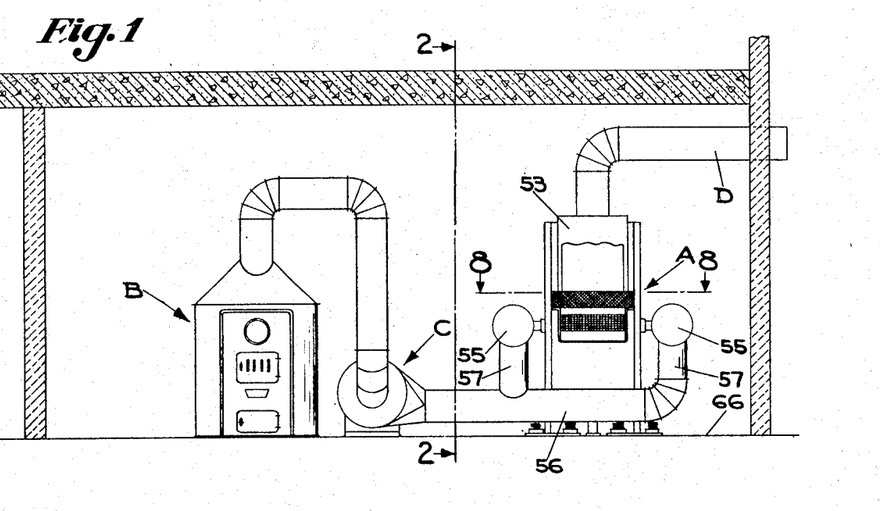
Fig. 1 is an elevational view of an installation comprising my invention.

Referring particularly to Fig. 1 of the drawings, there is disclosed an installation comprising the drying system of my invention. This installation comprises a vibratory drying conveyer A which is supplied with a hot drying gas, such as hot air, from a furnace B by means of appropriate conduits and a blower C which may be of the centrifugal type. Hot air is extracted from the furnace B by the blower C, and by said blower C and appropriate conduits delivered to the vibratory drying conveyer A where it is employed to dry granular material carried by said drying conveyer A, after which the air is discharged through a conduit D or, if desired, it may be returned by the conduit D to the furnace B.

Figure 7:
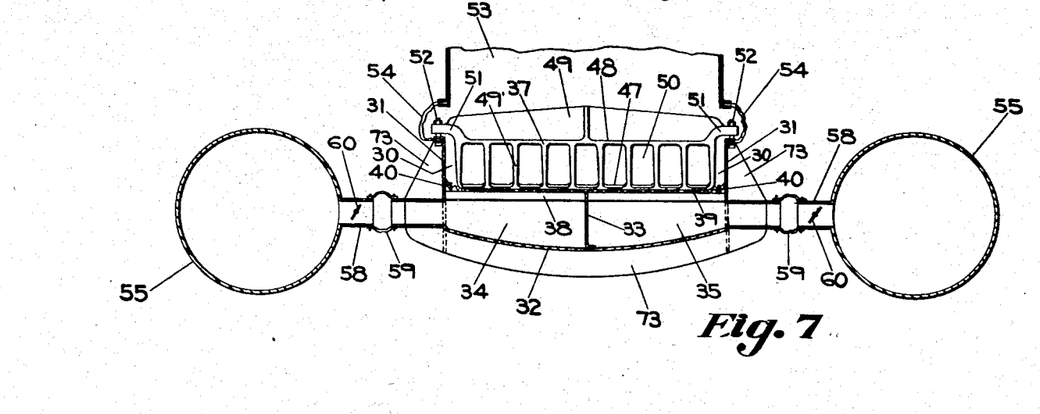
Fig. 7 is an enlarged transverse elevational sectional view taken on the line 7—7 of Fig. 2 looking in the direction of the arrows.

Referring more particularly to Figs. 2, 3, 4, 7 and 8, it is seen that the vibratory drying conveyer A comprises a deck chute 30 having side walls 31 and a bottom 32. As best seen in Fig. 7, extending longitudinally of the deck chute 30 and projecting upwardly from the bottom 32 is a dividing plate 33 which is effective to divide the lower portion of the deck chute 30 into two longitudinally extending compartments. At spaced intervals along the deck chute 30, there are also provided transversely extending plates 36 (Figs. 3 and 4) which perform the double function of dividing the deck into cells or sub-compartments 34 and 35 and of supporting transversely extending screen cloth clamping means 37. It will thus be seen that the longitudinal plate 33 and the transverse plates 36 divide the lower portion of the deck chute 30 into a plurality of individual cells or sub-compartments 34 and 35.

Extending transversely of the deck chute 30 between the side walls 31 and rigidly attached to said side walls 31, as by welding, is a plurality of screen cloth or bottom plate supports 38. These transverse supports 38 may comprise inverted hollow bars and, in the case where a screen cloth is employed, said bars may be covered with heat resisting cushion means to minimize screen cloth wear.

Supported upon the supports 38 and upon the plates 33 and 36 and extending substantially between the side walls 31 is a screen cloth or bottom plate 39. This screen cloth or bottom plate 39 will be of open construction having relatively small openings of insufficient size to allow the material carried in the deck chute 30 to pass therethrough by permitting free passage of hot air upwardly through said screen cloth or plate to dry the material carried thereon. When a screen cloth is employed, side supporting plates 40 (Fig. 7) are preferably provided adjacent the side walls 31 which are overlapped by the screen cloth 39 to prevent any leakage of material into the bottom of the deck 30.

Figure 3:
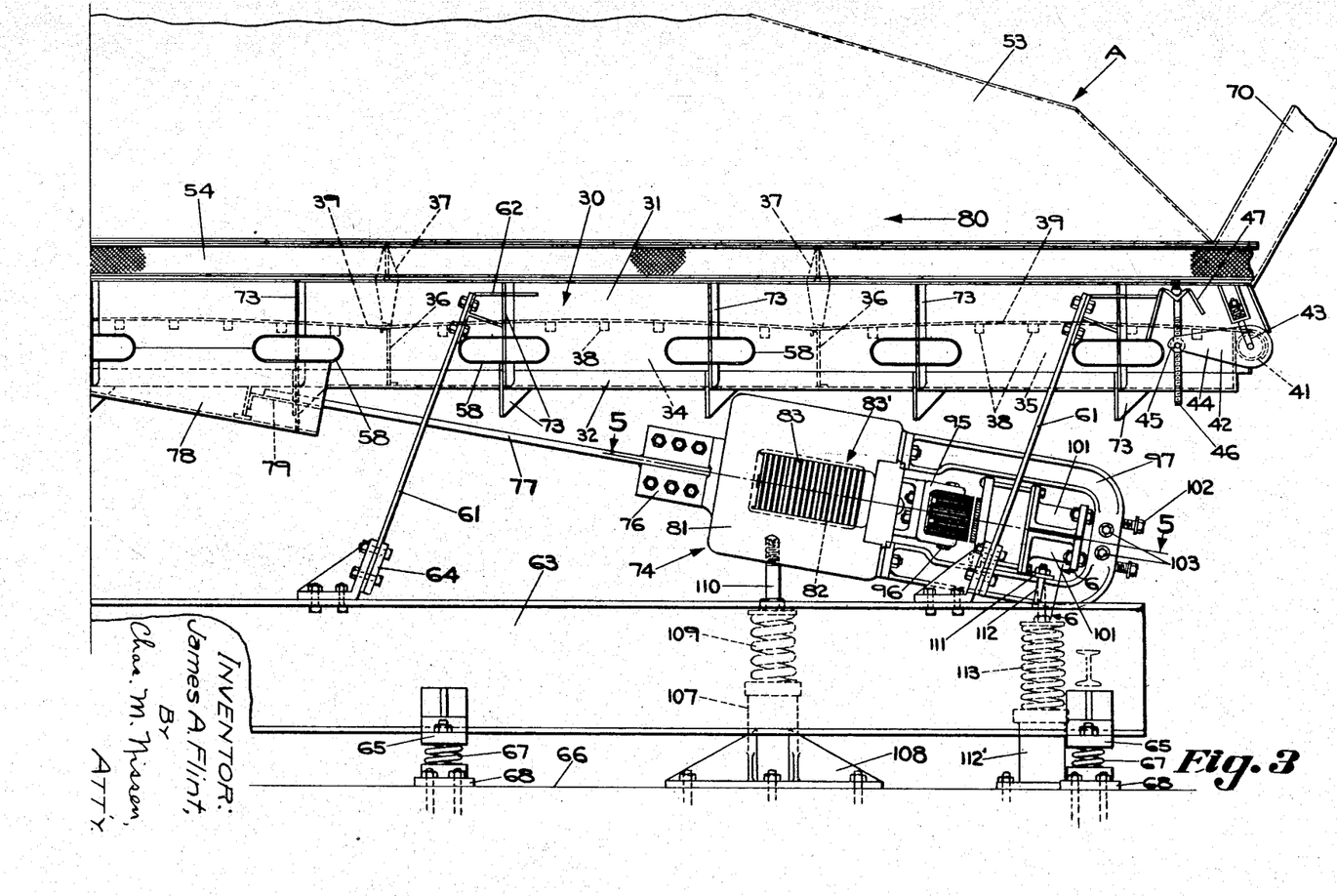
Figs. 3 and 4, placed end to end, comprise an enlarged side elevational view of the vibratory drying conveyer comprising my invention.
Figures 4, 6:
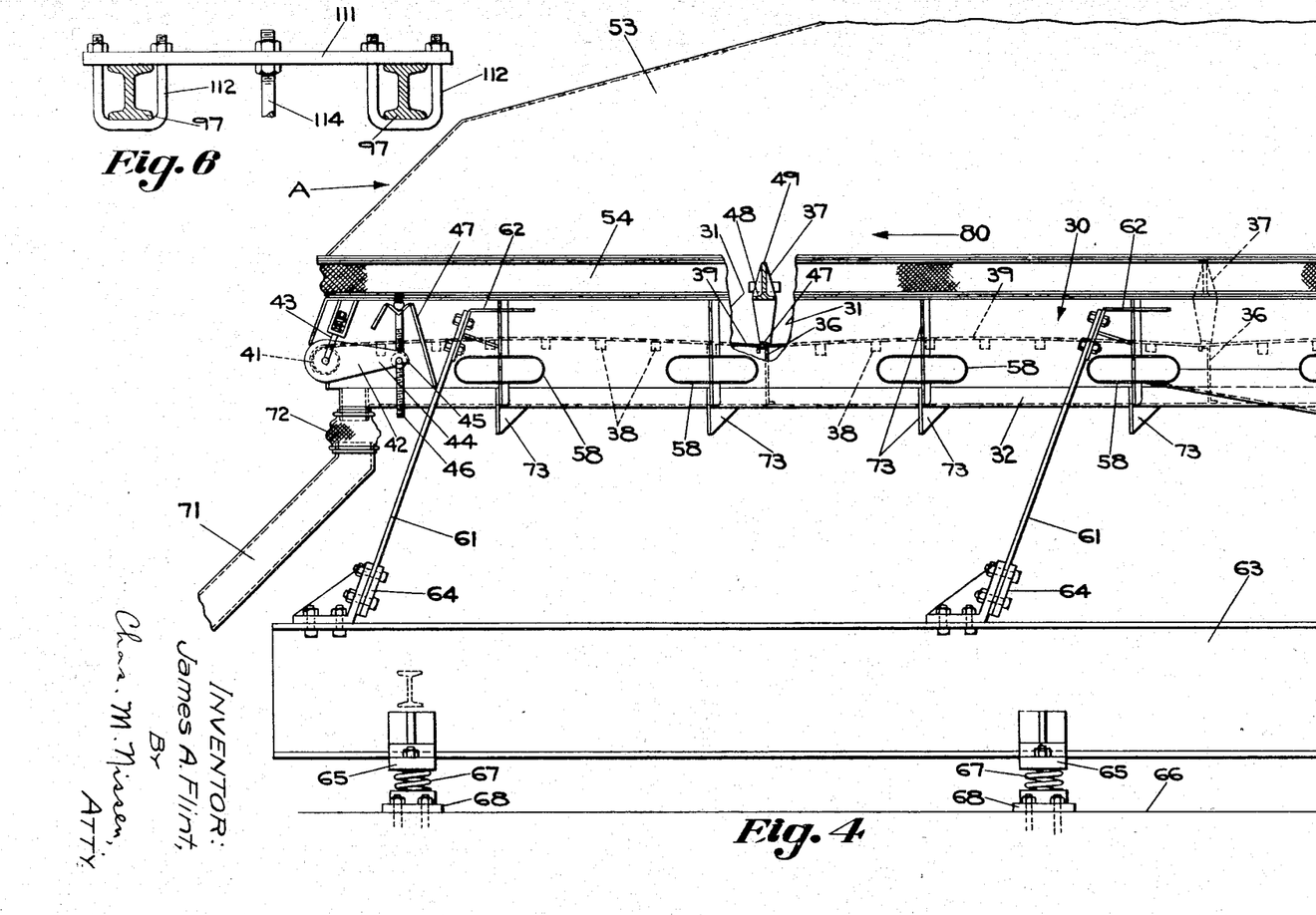
Fig. 6 is an enlarged sectional detailed view taken on the line 6—6 of Fig. 3.

As best seen in Figs. 3 and 4, when a screen cloth is employed, the ends thereof are rigidly attached to transversely extending tension drums 41 which extend between the side walls 31 of the deck chute 30. Each of these drums 41 is provided with end plates 42 which are provided with central holes, each of which is adapted to receive a retaining pin 43 which is flexibly supported from a side wall 31 and which retains the drums 41 in position, while allowing free rotary movement thereof. Each of the ends of plates 42 has an extending arm 44 which is bifurcated at 45 to receive a trunnion nut carried on a threaded shaft 46. The threaded shaft 46 is mounted by spring nut means to a bracket 47 carried on the side walls 31. It is thus evident that by adjusting the threaded shaft 46, the drum 41 may be rotated to tension the screen cloth 39.

Due to the extreme length of the screen cloth 39, proper tensioning thereof would not be accomplished merely by employing the end drums 41. I therefore provide intermediate clamping means for the screen cloth comprising the castings 37. As best seen in Figs. 3, 4, 7 and 8, the clamping means 37 are spaced at intervals along the deck chute 30 and their bottoms rest on the tops of the transverse plates 36 clamping the screen cloth 39 therebetween. It is preferred that the supports 38 which extend between the side walls 31 be so formed as to arch the screen cloth between the plates 36 or between a plate 36 and a drum 41. This arching is illustrated in Figs. 3 and 4 of the drawings.

It will thus be evident that the cells or sub-compartments 34 and 35 of the deck are provided with screen cloth areas which are maintained in proper tension and are preferably arched upwardly intermediate their ends. Where a rigid bottom plate 39' is employed, as distinguished from a screen cloth, the arched construction provided by the supports 38 need not be employed and the plate may be substantially horizontal throughout its longitudinal length or may even be dished or concave intermediate its ends. In addition, it is also possible where the bottom plate is employed to eliminate the clamping means 37 and to fasten the plate 39 rigidly with the supports 38 as, for example, by securing the plate 39 directly to said supports 38.

The construction of the clamping means 37 is best illustrated in Fig. 7 of the drawings. As here seen, said clamping means comprises a continuous bottom web 47 which is adapted to bear directly against the screen cloth 39 over substantially the entire transverse width of the deck chute 30 and to clamp said screen cloth 39 against the top of the transverse plate 36, which plate 36 is bent back on itself to provide an appreciable bearing surface. A top web 48 extends across the top of the clamping means 37 and includes a reinforcing rib 49. Between the top web 48 and the bottom web 47 extends a plurality of legs 49' which are preferably V-shaped in section plan view to present sharp edges to the material in the deck chute 30 and provide deflectors to the adequate openings 50 through which the material may readily flow as it progresses along the deck chute 30. Wings 51 extend from the sides of the top web 48 to provide means for clamping said clamping means 37 to the side walls 31 of the deck chute 30. Nuts and bolts 52 are provided to co-operate with the wings 51 to clamp said clamping means 37 to the deck chute 30.

Positioned above the deck chute 30 is a hood 53 which is supported by any desired means, such as standards, and is adapted to remove the hot gases from the deck chute 30, said hood leading to the conduit D. A flexible extension 54 is provided for the hood 53 for connecting the deck chute 30 to said hood 53, yet allowing free vibratory movement of said deck chute 30 with respect to the hood 53. This extension 54 may be of asbestos or canvas and it is rigidly attached to the hood 53 at its top and to the deck 30 at its bottom by any well-known means, such as a clamping plate and appropriate clamping bolts.

To provide for the delivery of the hot air from the blower C to the material carried by the deck chute 30, a pair of longitudinally extending plenum chambers 55 is provided which extend substantially the full length of the deck chute 30, one adjacent each side thereof. These chambers 55 are supplied with hot air from the blower C through the conduit 56 and branches 57 thereof. The plenum chambers 55 are preferably of sufficient size that the air pressure therein is fairly equal throughout their length. Extending from the plenum chambers 55 to the deck chute 30 is a plurality of conduits 58, each including a flexible portion 59 which may be made of asbestos or canvas, thereby allowing free vibratory movement of the deck 30 with respect to the chambers 55. Within each of the conduits 57 (Fig. 7) there is provided a valve 60 whereby the amount of hot air delivered to each of the cells or sub-compartments 34 or 35 of the deck chute 30 may be controlled.

Figure 8:
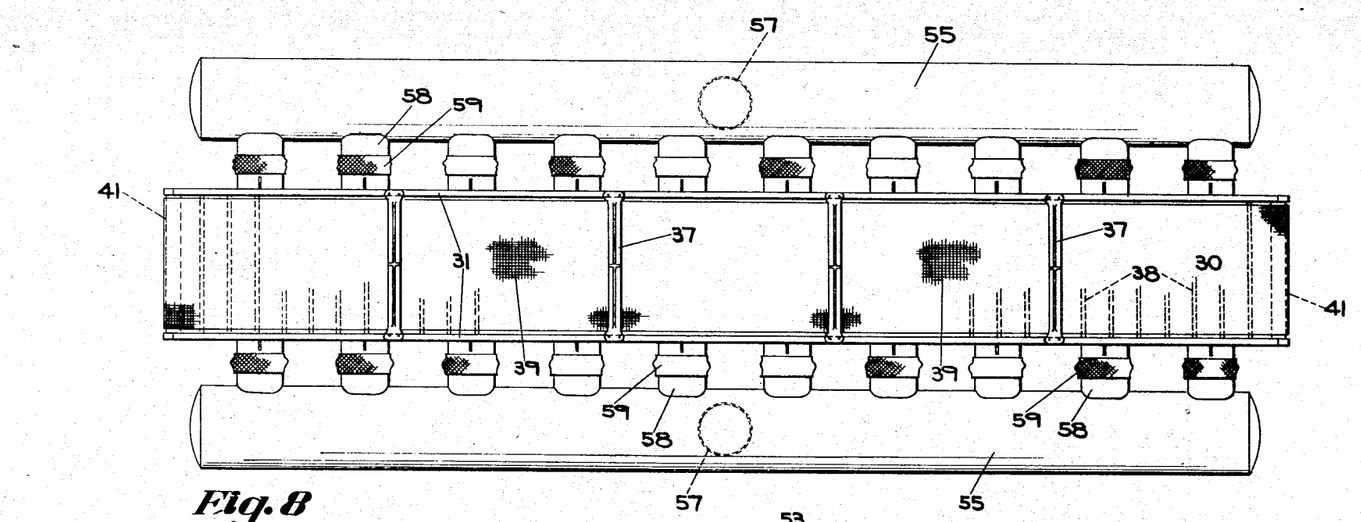
Fig. 8 is a plan view showing the deck and the air conduits of the vibratory drying conveyer of my invention.

As is seen from Figs. 3, 4 and 8, there are two conduits 58 for each of the sub-compartments 34 or 35 of the deck 30. This number may be reduced or increased as desired.

Figure 2:
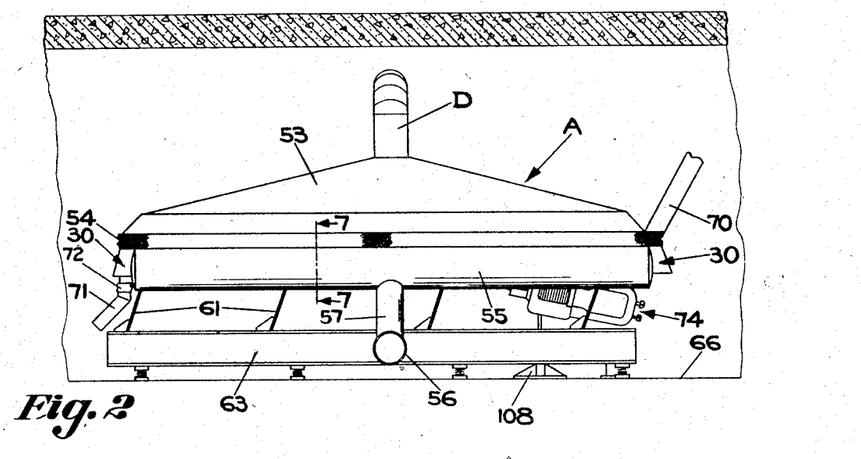
Fig. 2 is a side elevational view of the vibratory drying conveyer comprising my invention.

Referring particularly to Figs. 2, 3 and 4, it is to be noted that the deck chute 30 is mounted upon leaf spring cantilevers 61 which make an acute angle with the plane of the screen cloth or bottom plate 39. This acute angular relation provides for the conveying action imparted to the material by the deck chute 30 when said deck chute 30 is vibrated as hereinafter described. It is preferably made between 50 and 80 degrees. The cantilevers 61 are attached to the deck chute 30 by brackets 62 which are rigidly attached to said deck chute 30. The bottoms of the cantilevers 61 are mounted upon a pair of longitudinally extending I-beams 63 by appropriate brackets 64. The I-beams 63 are provided with transverse foot brackets 65 (Fig. 9), which brackets 65 are mounted from the foundation 66 by coil springs 67 carried in appropriate cups 68 on base plates 69.

The deck chute 30 is also provided with an intake chute 70 which is adapted to feed the material to said plate 39 and, with chute 71, adapted to deliver the dried material from said deck chute 30. Appropriate flexible connecting means 72 is provided between the deck chute 30 and the chute 71 to allow relative movement therebetween. If the chute 70 is stationary, a similar flexible means will be provided between it and the deck chute 30. The deck chute 30 may also be provided with both side and bottom reinforcing plates 73 to increase the rigidity thereof.

As best illustrated in Fig. 3 of the drawings, a vibratory motor indicated generally at 74 is provided to impart vibrations to said deck chute 30 along an axis passing through the center of percussion thereof. This motor 74 is provided with an armature shaft 75 which has a T-shaped head 76 (Fig. 5) to which is attached a plurality of connecting bars 77 for attaching the armature shaft 75 of said motor 74 to the deck chute 30. Appropriate attaching plates 78 and brackets 79 are provided for attaching the connecting bars 77 to the walls 31 of said deck chute 30. It is thus evident that if the armature shaft 75 of the motor 74 is vibrated along the plane of the connecting bars 77 a vibratory motion will be imparted to the deck chute 30. Due to the angular position of the cantilevers 61 with respect to said deck 30, this vibratory motion of said deck 30 will have both a vertical component and a horizontal component, which will be effective to throw or impel any material on the deck screen cloth or deck bottom plate 39, into the air and to transfer any material on said screen cloth of bottom plate 39 in the direction of the arrows 80 (Figs. 3 and 4). Therefore, if any material to be dried is fed to the deck chute 30 through the intake chute 70, the deck chute 30 will convey said material over the deck screen cloth or deck bottom plate 39 and discharge it at the discharge chute 71. As the material is transferred across the screen cloth or bottom plate 39, it will be constantly impacted by said screen cloth or bottom plate 39 which will have the effect of transforming the entire bed of materials into a fluid-like bed, each particle of which is slightly spaced from each other particle, thereby exposing its entire area to the surrounding atmosphere, and each particle of which is constantly being impacted and being rolled or turned over and over. In addition, the vibratory action of the deck chute 30 will be effective to distribute the material evenly over the entire transverse surface of the screen cloth or bottom plate 39. This prevents the passage of the material down the deck chute 30 in a pile and insures complete aeration of each individual particle of the bed of materials. While said material is being transferred as above mentioned, the hot drying air will be distributed from the plenums 55, 55 through the conduits 58 into the sub-chambers 34, 35 from which the hot air flows upwardly through the interstices of the screen or perforated deck, as illustrated in Figs. 7 and 8, and will effectively dry each individual particle of material in the bed on the deck by direct action thereon. Due to this fluid-like condition of the entire bed of materials on the deck with a substantially uniform depth over substantially the entire area of the screen cloth or bottom plate 39, very efficient drying of the materials is effected.

The detailed construction of the vibratory motor 74 will now be described and reference is made particularly to Figs. 3, 5 and 9. The main frame 81 of said motor 74 comprises a very heavy casting which has a longitudinally extending opening 82 adapted to receive a plurality of vibrator bars or spring leaves 83. These spring leaves 83 are clamped adjacent their ends between bosses 84 on said main frame 81 and clamp plates 85 which are clamped by clamp screws 86. Appropriate spacers 87 are stacked between the individual spring leaves 83 adjacent their ends whereby freedom of flexure of each of these spring leaves 83 will be provided. Adjacent their centers, the spring leaves 83 are rigidly clamped to the armature shaft 75 between a boss 88 and a clamp plate 89 thereof. The clamp plate 89 is flexibly attached to a web 90 of armature shaft 75 by a bolt 91 surrounded by a weak spring 92. Clamping studs 93 are provided for clamping the spring leaves 83 between said boss 88 and clamp 89. Appropriate spacers 94 are also stacked between the spring leaves 83 along the line of the boss 88 and clamp plate 89. The stacked spring leaves 83 and spacers 87 and 94 thus form a leaf spring 83'.

Adjacent one end, the armature shaft 75 carries an armature 95' which is clamped to said shaft 75 by an appropriate clamping bracket 95 and appropriate tie bolts 96. The armature 95' is preferably built up of laminated steel sheets. It is evident that armature 95' is flexibly mounted with respect to the main frame 81 by leaf spring 83', as shown in Figs. 3 and 5.

Rigidly attached to the main frame 81 is a pair of U-shaped brackets 97 to which is rigidly attached the stator or field structure 98 of the motor 74. Said field structure comprises a magnetic field core 99, preferably made of laminated steel plates attached and anchored by appropriate tie bolts 100 which extend between appropriate clamping plates, said field core 99 being carried upon brackets 101 which are adjustably supported from the U-shaped brackets 97 by adjustable bolts 102. The U-shaped brackets 97 are split along their threaded portions which receive the bolts 102 and are provided with transversely extending clamp bolts 103 for clamping the field structure 98 in a fixed position of adjustment which may be adjusted by the bolts 102. It is evident that the bolts 102 may be adjusted to determine the normal air gap between the field core 99 and the armature 95'. This air-gap is such that the armature 95' never strikes the core 99 during operation. The field structure 98 also includes a pair of field coils 104, one for each leg of the U-shaped field core 99, which field coils 104 may be connected either in series or in parallel, and so that the two poles adjacent the armature 95' will be of opposite polarity. An appropriate clamping plate 105 and tie bolts 106 are provided for attaching the field coils 104 to the field structure 98. It will be evident that appropriate leads are provided for the field coils 104 to connect said field coils to a source of alternating current and a rheostat may be connected either in series or in parallel with said field coils to adjust the strength of the current therein whereby the amplitude of vibration of the deck chute 30 and thus the rate of travel of the material may be readily adjusted.

Figures 5, 9:
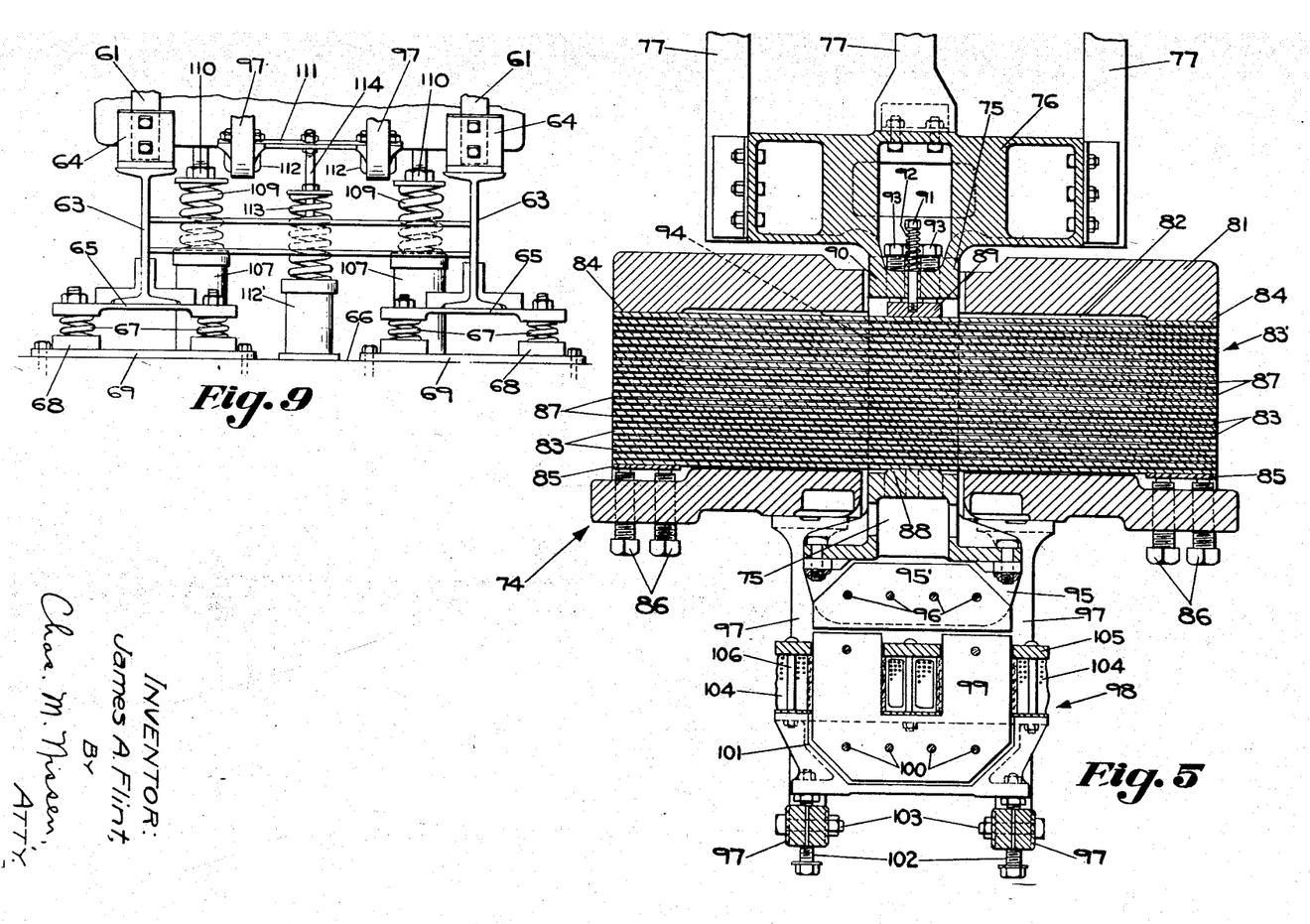
Fig. 5 is a longitudinal sectional view of the vibratory motor of my vibratory drying conveyer taken on the line 5—5 of Fig. 3 looking in the direction of the arrows.
Fig. 9 is an enlarged detailed end view showing the resilient mounting means of the vibratory drying conveyer of my invention.

As best illustrated in Figs. 3 and 9, the main frame 81 is mounted upon the foundation 66 by spaced standards 107 provided with appropriate attaching bases 108 and carrying coil springs 109 adapted to receive downwardly extending brackets 110, which brackets 110 are attached to said main frame 81. The U-shaped brackets 97 have rigidly attached thereto a transverse bar 111 (Fig. 6) which is attached to said brackets 97 by appropriate U-bolts 112. The central portion of the bar 111 is flexibly supported from the foundation 66 by a standard 112' which carries at its top the coil spring 113 which supports the bracket 114 rigidly attached to the center of said bar 111. It will thus be seen that the motor 74 is flexibly supported from the foundation 66 by a three-point flexible suspension means and that the deck chute 30 is also flexibly supported upon the foundation 66. This flexible supporting of teh entire vibratory drying conveyer A prevents the transfer of any vibrations to the foundation 66.

In practice, the I-beam 63 and the main frame 81 of the power unit 74 are made as heavy as possible in order that the vibratory motion of the motor 74 may be transferred largely to the deck chute 30 rather than in resulting in the vibration of the main frame 81 and/or the I-beams 63. It may be mentioned that as the field stator of the structure 98 is so adjusted with respect to the armature 95' that under no operating condition will there be an actual striking of the armature 95' with the poles of the core 99 of the stator or field structure 98, the vibratory movement of the deck A will be essentially sinusoidal and will be devoid of sharp shocks.

One important feature of my invention lies in the fact that the motor 74 may be energized directly from a commercial source of alternating current which may be of 25, 30, 50 or 60 cycles per second and no extraneous apparatus, such as a motor generator set to act as a frequency reducer, is necessary. When the device is operated from a source of alternating electric current of 60-cycle frequency, the frequency of vibration of the armature 95', and consequently the frequency of vibration of the deck chute 30, will be 7200 cycles per minute. This is due to the fact that for each half cycle of operation the armature 95' will be attracted to the field 98 and when the alternating flux in the magnetic field core 99 passes through zero the armature 95' would be effectively released and the energy which was stored up in the spring leaves 83 upon the attraction of the armature 95' will move said armature away from said field structure 98. It is thus evident that the frequency of vibration of armature 95' will be twice the frequency of energizing current.

This ability to operate directly from the usual commercial frequencies is of great practical importance in eliminating costly equipment and reducing the parts requiring attention. The entire vibratory apparatus is thus entirely devoid of rotating machinery and there is no element which requires lubrication.

In addition, the high frequency of operation incident to using commercial frequencies, coupled with the angle of inclination of the cantilevers 61, provides a deck which moves with a vertical component such that it recedes from the bed of material faster than said bed can fall. As a consequence, the bed is fluidized and flows like water. It does not act as a dead load on the deck and therefore, regardless of load variations, the natural period of oscillation of the deck will be substantially constant. That is, the downward movement of the deck, or its vertically downward component of movement, is faster than the velocity at which the material will fall. As a consequence, the material will not ride downwardly on the bottom plate 39, but said plate will strike the downwardly moving particles of material while it (the plate) is moving upwardly. The effect will be similar to a bat hitting a ball and will impel the particles of material into the air, said particles therefore only touching the bottom plate 37 at intervals to be impacted thereby and proceeding down the deck 30 in a series of hops, all the while they are rolling over and over, and constantly exposing substantially their entire surfaces to the surrounding atmosphere, thereby aiding greatly in the drying action of the hot air flowing through the interstices of the bed and increasing greatly the drying efficiency of the device and providing a highly improved method of drying granular particles.

Where the motor 74 is operated as aforesaid from current of 60 cycles, and has an amplitude of vibration of the deck 30 of approximately $\frac{1}{16}$ in., the angle of inclination of the cantilevers 61 to the average surface of bottom plate 39 may be set at 10 degrees, though usually a 15-degree angle is employed. With a lower operating frequency, the angle of said cantilevers 61 to said plate 39 should be increased to maintain the condition wherein the downward movement of the bottom 39 is at a rate greater than the falling velocity of the material particles.

It is also contemplated that the motor 74 will be operated by "mixed current"—that is, by connecting a source of direct current in series with the source of alternating current. When this type of energization of the motor 74 is employed, the frequency of vibration of armature 95', and thus the frequency of deck chute 30, will be the same as the frequency of the alternating current source. For example, if the alternating current source has a frequency of 60 cycles, then the frequency of vibration of deck chute 30 will be 3600 vibrations per minute rather than 7200 vibrations per minute. The frequency of vibration for alternating current sources of 25, 30 and 50 cycles under similar conditions will be obvious. Such a system for energizing a vibratory screen is disclosed in full detail in my patent for an Electric reciprocating motor, No. 1,846,326, issued February 23, 1932.

Another important feature of my invention lies in the mode of operation of the deck chute 30. Said deck chute 30 and all those parts which are rigidly attached thereto comprise a vibratory structure having a natural period of vibration. This period of vibration will be determined primarily by the weight of the vibratory structure and the restoring force of the leaf spring 83' and cantilevers 61. The restoring force of cantilevers 61 will, in general, be relatively small. In practice it has been found to be extremely desirable to determine this natural period of vibration of the vibratory structure at a frequency which is near to, but slightly different from, the frequency at which the armature 95' is vibrated. For example, if the armature is vibrated by a current having a frequency of 60 cycles per second or at a frequency of 7200 cycles per minute, the natural period of the body is preferably selected at a value slightly above or slightly below 7200 cycles per minute, for example, at 7000 or 7400 cycles per minute. It is entirely possible to operate the device by determining the natural period of vibration at exactly the period of vibration of the armature 95' which, in the example given, would be 7200 cycles per minute. It has been discovered, however, that if the period of vibration of said vibratory body is in exact resonance with the frequency of vibration of the armature 95', the amplitude of vibration of the deck chute 30 will vary appreciably with the load which is placed in said deck chute or, in other words, with the amount of material which is placed on the bottom plate or screen cloth 39. In addition, it has been found that when no material whatever is carried on the screen cloth or bottom plate 39 there is danger of the armature 95' striking the poles of the coil 99 of the field structure 98 and causing damage to either or both if exact resonance is maintained. This is due to the fact that when a vibratory body is operating at its natural frequency the energy necessary to vibrate said body is represented only by the frictional losses thereof and there is a possibility of the amplitude of vibration becoming unduly large. However, by vibrating the vibratory structure at a period slightly different from its natural period, either above or below the natural period, the vibrations thereof are forced and there is always a minimum amount of artificial load on said vibratory structure. This prevents any damage to the motor when the actual physical load—for example, the material carried on the screen cloth or bottom plate 39—is reduced to zero. In addition, it means that the vibrations in the actual physical load represented by the material carried on the screen cloth or bottom plate 39 will not have a great effect on the amplitude of vibration of the deck 30. As a consequence, the amplitude of vibration of said deck chute 30 will be substantially constant regardless of the actual physical load carried on the screen cloth or bottom plate 39. Furthermore, by operating the vibratory structure at a frequency which is near its natural period, the amount of energy necessary to vibrate said vibratory structure is very materially reduced over what it would be if said vibratory structure were not operated near its natural period but was operated at a frequency distantly removed therefrom. This results in a great saving in operating costs due to the use of a small amount of current and makes possible the employment of a motor 74 which is of smaller size than would otherwise be possible. If the deck chute 30 is of such size that a single motor 74 will not suffice to vibrate it, a plurality of such motors may be employed and said motors will be operated in synchronism and in phase.

To review the operation of the device, hot granular material will be fed into the deck chute 30 from the intake chute 70. As the material is received on the screen cloth or bottom plate 39, it will be subjected to a vibratory action due to the vibratory movement of said deck chute 30 and of the screen cloth or bottom plate 39 under the action of the motor 74. This vibratory movement will have both a vertical component and horizontal component and will be effective to fluidize the entire bed causing the bed to distribute uniformly over the entire area of screen cloth or bottom plate 39. Due to the particular vibratory movement above mentioned, the individual particles of material will be impacted by the screen cloth or bottom plate 39 and thrown into the air whereby they will be constantly turning over and over and, in addition, will be entirely separated from each other particle in the mobile bed. The hot drying gas will flow upwardly through the screen cloth or bottom plate 39 and through the interstices of the bed and will effectively dry each individual particle of the bed of materials. This action will be continued throughout the length of the deck 30 and by the time the material has reached the discharge end of said deck it will be completely dried, whereupon it will be discharged into the chute 71.

As was previously mentioned, a screen cloth may be employed at 39 to support the material being dried and conveyed or a perforate plate may be employed in its stead. In Figs. 12 to 21, inclusive, there are illustrated a number of different forms of plates which may form a supporting means 39 for the bed of material. The drawings are substantially self-explanatory and thus only a brief description of each will be necessary.

Figures 12, 13:
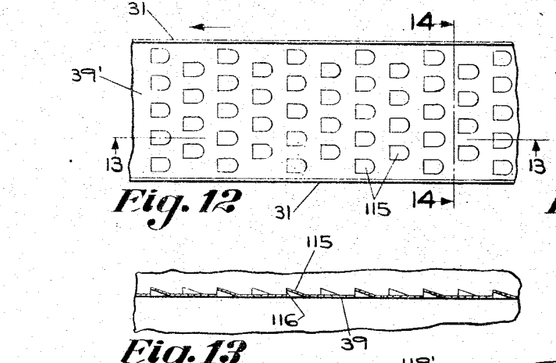
Fig. 12 is a plan view of one form of deck covering.
Fig. 13 is a longitudinal sectional view taken on the line 13—13 of Fig. 12 looking in the direction of the arrows.
Figures 14, 15, 16, 17:
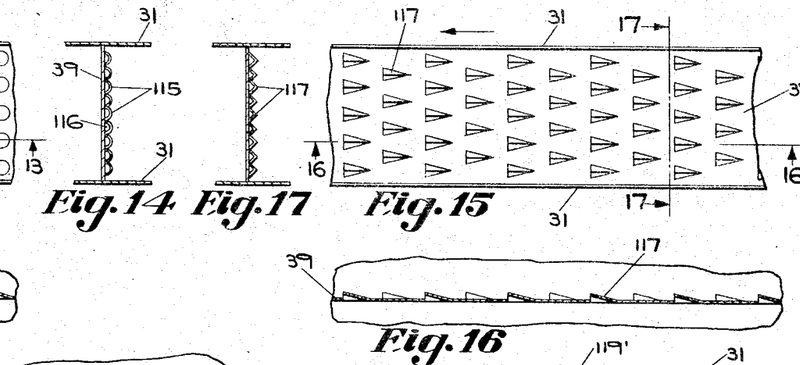
Fig. 14 is a transverse sectional view taken on the line 14—14 of Fig. 12 looking in the direction of the arrows.
Fig. 15 is a plan view of another form of deck covering.
Fig. 16 is a longitudinal sectional view taken on the line 16—16 of Fig. 15.
Fig. 17 is a transverse sectional view taken on the line 17—17 of Fig. 15.

In the deck illustrated in Figs. 12, 13 and 14, a continuous plate is provided which extends between the side walls 31 of the deck chute and has struck out louvers 115 which provide air openings 116 which face down stream of the direction of the flow of the material, as indicated in Fig. 12. This allows free passage of the air through the plate 39 and prevents any tendency for the material to flow downwardly through said plate 39. The openings 116 are formed by the severance of the bed plate 39 along transverse edges which may be cut by a stamping. Figs. 15, 16 and 17 show a somewhat similar bottom plate 39 except that the louvers 117 have sharp ridges in the backs thereof, formed by means of a cutting and stamping die.

Figures 18, 19, 20:
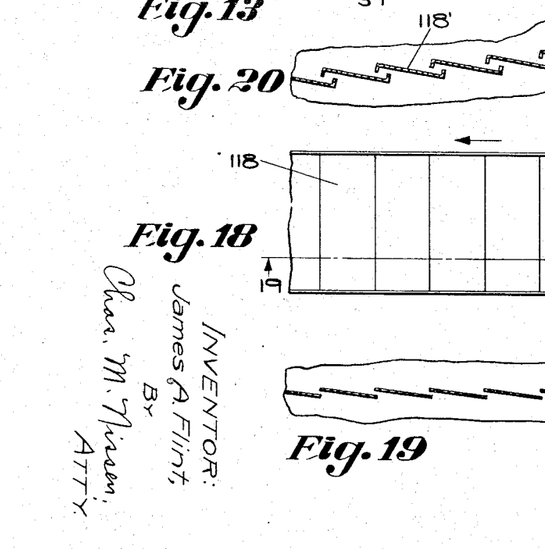
Fig. 18 is a plan view which may fairly represent either of two deck coverings.
Fig. 19 is a longitudinal sectional view taken on the line 19—19 of Fig. 18 illustrating one form of deck covering.
Fig. 20 is a longitudinal sectional view taken on the line 19—19 of Fig. 18 showing another form of deck covering.

In Figs. 18, 19 and 20, the deck openings are provided by a plurality of inclined plates 118, the edges of which are vertically spaced and slightly overlapping. In the form illustrated in Fig. 20, the plates 118' are made Z-shaped more effectively to prevent certain materials from falling through the deck and at the same time providing a circuitous path for the flow of hot air to prolong its contact with the plates.

Figures 21, 22, 23, 24:
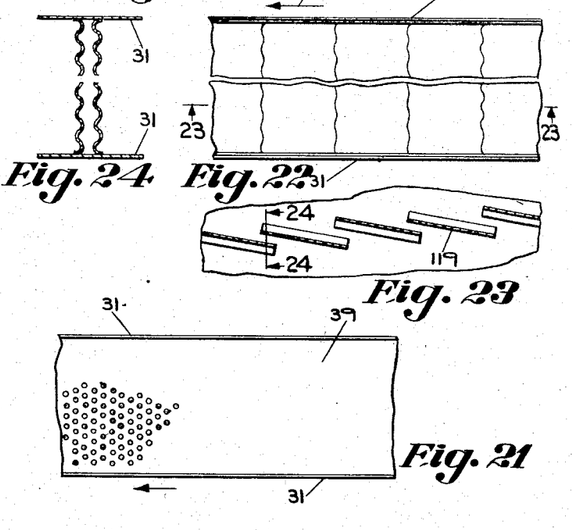
Fig. 21 is a plan view of deck covering comprising a perforated plate.
Fig. 22 is a plan view of a deck covering comprising spaced corrugated plates.
Fig. 23 is a longitudinal sectional view taken on the line 23—23 of Fig. 22 looking in the direction of the arrows.
Fig. 24 is a transverse sectional view taken on the line 24—24 of Fig. 23 looking in the direction of the arrows.

As illustrated in Fig. 21, the bottom plate 39 is merely a flat plate provided with a plurality of small perforations, which may be circular in form, and each smaller in diameter than any of the particles to be conveyed.

As illustrated in Figs. 22, 23 and 24, laterally extending tilted plates 119 are provided, which plates are corrugated, as seen in lateral cross section, as best seen in Fig. 24. Such longitudinal corrugation of either a continuous or a sectional deck serves to present to the material a large drying area in a small amount of space. This construction also separates the material into several parts, each part having an inverted triangular cross-sectional area. Hence, all material is in close contact with the cooling surface. The material will flow in the direction indicated by arrow 119'. Due to the overlapping of the tilted plates 119, the material will not pass through the bottom plate 39 but hot air will be free to pass upwardly therethrough and through the material carried thereby.

It is evident that any of the bottom plate structures of Figs. 12 to 21, inclusive, may be substituted for the screen cloth and, as was previously set forth, under these conditions the screen cloth clamping means 37 may be omitted and the arched construction of the cells or subcompartments 34 and 35 of the deck chute 30 may also be omitted, as above set forth.

Figures 10, 11:
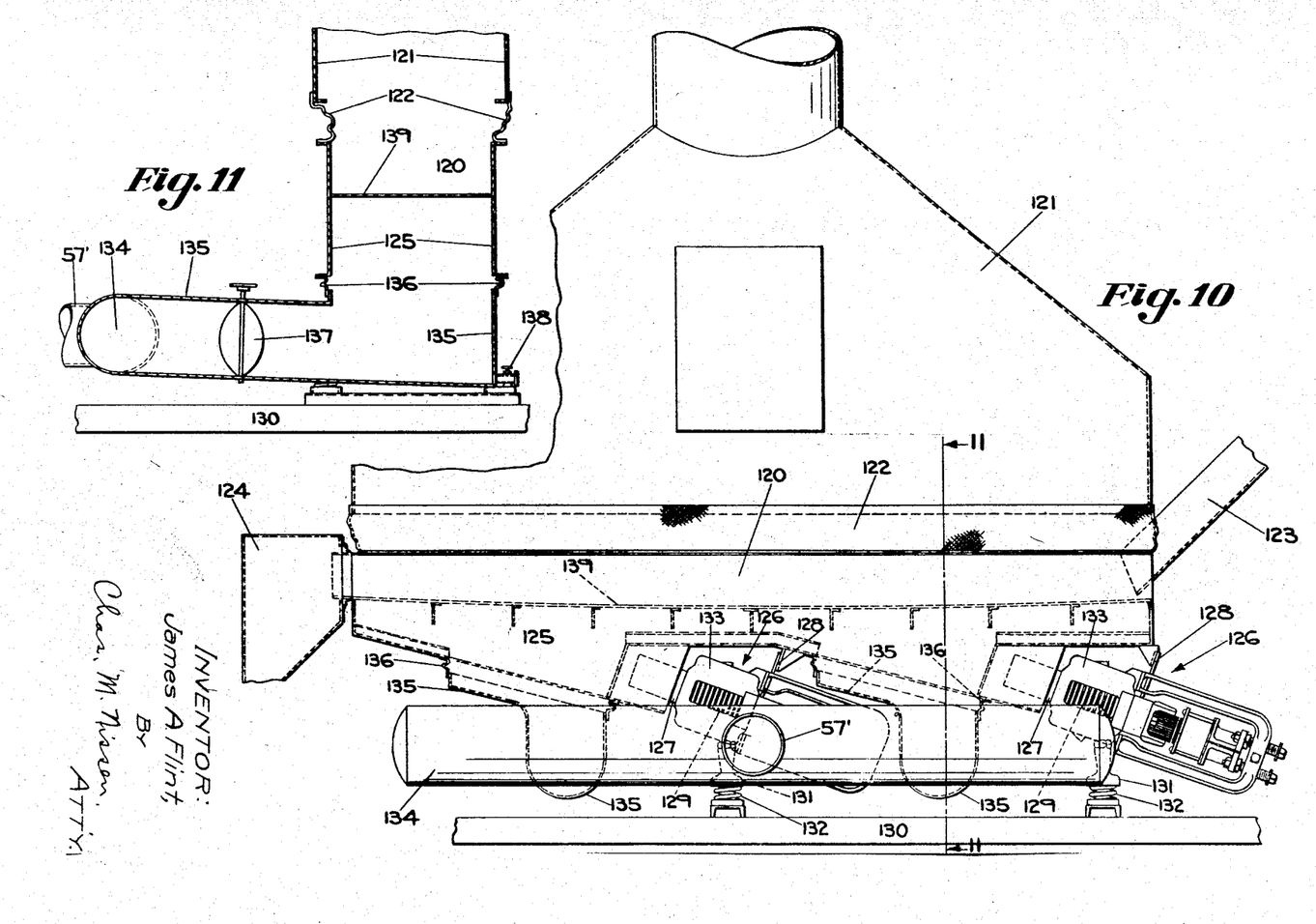
Fig. 10 is a side elevational view of a modified form of vibratory drying conveyer comprising my invention.
Fig. 11 is a transverse sectional elevational view taken on the line 11—11 of Fig. 10 looking in the direction of the arrows.

Referring to Figs. 10 and 11, there is illustrated a modified form of vibratory drying conveyer comprising my invention. This device comprises a deck chute 120. A hood 121 is also provided which is attached to said deck chute 120 by a flexible connection 122. An appropriate feed chute 123 and a material receiving hopper 124 are provided. In this form of my invention, the deck chute 120 is provided with downwardly extending side plates 125 which form a hot air receiving chamber.

A plurality of vibratory motors 126 is provided for vibrating the deck chute 120. These vibratory motors 126 are generally of the construction of the vibratory motors 74, above described in detail, except in such particulars as will now be pointed out. Said motors 126 are provided with armature shafts 127 which may be directly attached to the side plates 125 through a T-shaped head similar to the T-shaped head 76 of the motor 74. In addition, the armature shaft 127 carries a bracket 128 which extends rearwardly of the leaf spring 129 of the motor and which is attached to the deck chute 120. The entire deck chute 120 is supported by the armature shaft 127 as there is an absence of any cantilever supporting means therefor similar to the cantilevers 61 of the device of Figs. 2, 3 and 4. The vibratory motors 126 are supported from the foundation 130 by spring-mounted brackets 131 carried upon spiral or coil springs 132. The brackets 131 are rigidly attached to the main frames 133 of the motors 126.

A single plenum chamber 134 is provided for furnishing the hot air to the deck chute 130 and a pair of laterally extending conduits 135 is provided for connecting the plenum chamber 134 to the lower side of the deck 139. Flexible connecting means 136 are provided between the conduits 135 and the deck 120. Air control dampers 137 are provided for each of the conduits 135 to control the flow of hot air to the deck chute 120.

It is to be noted from Fig. 11 that the bottom wall of the conduit 135 is tapered downwardly and leads to a valve 138 whereby any liquid which passes through the screen cloth or bottom plate 139 of the deck chute 120 may be readily removed or drained therefrom.

The operation of the device of Figs. 10 and 11 is essentially that described in connection with the device disclosed in Figs. 2, 3 and 4 and thus need not be repeated. The essential differences are obvious and include the supporting of the deck chute 120 directly from the motor 126 and the provision of the flow of hot air upwardly from beneath the deck 139 rather than into the sides of chambers below deck 39. This also allows for the use of the single plenum chamber 134 in Figs. 10 and 11 rather than the two plenum chambers 55, 55 in Fig. 8.

It will be evident that the mounting of the deck chute 120 of the device of Figs. 10 and 11 may be similar to that of the deck chute 39 of Figs. 2, 3 and 4 and the operating motors of the device of Figs. 10 and 11 may also be similar in construction and mounting to the operating motor 74 of the device of Figs. 2, 3 and 4. Conversely the deck chute 39 of the device of Figs. 2, 3 and 4 may be mounted directly upon a plurality of motors in a manner similar to that in which deck chute 120 is mounted on the motor 126. It is to be noted that in this type of mounting the armature 127 is attached to the deck 120, both forwardly and rearwardly of the leaf spring 129 by the T-shaped head of the armature 127 and by the brackets 128, respectively, thereby reducing the static bending moment on the leaf spring 129 which would be present if the brackets 128 were omitted, and reducing any tendency for the deck 120 to buckle by distributing the vibratory forces over a larger area thereof.

It is also to be noted that bottom plate or deck 139 is illustrated in Fig. 10 as dished or concave. This form may also be used in the drier disclosed in Figs. 2, 3 and 4 and has the desirable characteristic of aiding the travel of the material thereacross at the feed end where it is wet, the tending to cause it to travel slowly at the discharge end where it is dry and travels more readily.

It may also be mentioned that where a plurality of motors, as motors 126, are employed, the longitudinal axis of the armatures 127 thereof pass through the centers of percussion of selected portions of the deck chute 120.

It is also contemplated that either of the devices of my invention be employed as a cooler. When so employed, hot granular material may be fed thereto through chute 70 or 123 and instead of supplying heated air thereto, either cooled or ambient temperature air will be supplied. It is also possible to use an imperforate bottom plate 39, either flat or corrugated, which is heated by hot air or any other heated medium and when this type of bottom is employed a current of dry air may be passed over the top surface of the material being dried, thereby assisting in drying and carrying off moisture vapors. It is evident that a very efficient cooling means and method will be presented thereby.

It is also to be noted that when either of the devices is operating as a drier, the material supporting bottom 39 or 139 not only allows hot air to pass through the bed of materials but the contacting of the material particles with this hot bottom surface will also aid in the drying action.

Likewise, when the device is operating as a cooler, the contacting of the material particles with this cooled bottom surface will also aid in the cooling action.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I desire to secure by Letters Patent of the United States is:

1. In a vibratory conditioner and conveyer, the combination with a deck having a material supporting bottom formed of screen cloth, of a base, means including inclined cantilevers connecting said deck and base for vibrating said deck at a high frequency and to impart both a vertical and a horizontal component of movement thereto whereby granular material thereon will be conveyed while the particles thereof form a fluid bed, and means for conditioning said particles while being conveyed as aforesaid, said means comprising a source of conditioning gases and conduits for directing said gases through said fluidized bed.

2. In a vibratory drier and conveyer, the combination with a deck comprising a longitudinally extending trough, of a perforate material supporting member extending above the bottom of said trough and between the side walls thereof, drying means adapted to direct hot gases through said member, means comprising inclined leaf springs for supporting said deck for vibrating movement whereby it will have both a vertical and a horizontal component of movement when vibrated, and a vibrating motor for vibrating said deck, said vibratory motor being constructed and arranged to vibrate said deck at a frequency not less than 3000 cycles per minute.

3. Clamping means for a screen cloth comprising spaced upper and lower webs, spaced legs extending between said webs forming openings adapted to permit free movement of material therethrough, and attaching wings extending laterally of said upper web.

4. In a vibratory conditioner and conveyer, the combination with a deck having a material supporting bottom, of means for conditioning the temperature of said material, means for supporting said deck for vibratory movement, said deck and supporting means comprising a vibratory structure having a natural period of vibration substantially independent of the weight of the load thereon and not less than 6900 cycles per minute or more than 7500 cycles per minute, a vibratory non-rotary continuous circuit electric motor for vibrating said deck at a frequency of 7200 cycles per minute, and means to supply alternating current of 60 cycle frequency to said motor.

5. In a vibratory conditioner and conveyer, the combination with a deck having a material supporting bottom, of means for conditioning the temperature of said material, means for supporting said deck for vibratory movement, said deck and supporting means comprising a vibratory structure having a natural period of vibration substantially independent of the weight of the load thereon and not less than 5700 cycles per minute or more than 6300 cycles per minute, a vibratory non-rotary continuous circuit electric motor for vibrating said deck at a frequency of 6000 cycles per minute, and means to supply alternating current of 50 cycle frequency to said motor.

JAMES A. FLINT.